United States Patent
Han et al.

(10) Patent No.: US 11,637,891 B2
(45) Date of Patent: Apr. 25, 2023

(54) METHOD AND APPARATUS FOR TRANSFERRING AN EDGE COMPUTING APPLICATION

(71) Applicant: ZTE CORPORATION, Shenzhen (CN)

(72) Inventors: Zhiqiang Han, Shenzhen (CN); Qiang Huang, Shenzhen (CN); Bo Sun, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/057,570

(22) PCT Filed: Apr. 26, 2019

(86) PCT No.: PCT/CN2019/084668
§ 371 (c)(1),
(2) Date: Nov. 20, 2020

(87) PCT Pub. No.: WO2019/223496
PCT Pub. Date: Nov. 28, 2019

(65) Prior Publication Data
US 2021/0203715 A1 Jul. 1, 2021

(30) Foreign Application Priority Data
May 25, 2018 (CN) .......................... 201810517227.1

(51) Int. Cl.
*H04L 67/10* (2022.01)
*H04L 67/148* (2022.01)
*H04L 67/00* (2022.01)

(52) U.S. Cl.
CPC ............ *H04L 67/10* (2013.01); *H04L 67/148* (2013.01); *H04L 67/34* (2013.01)

(58) Field of Classification Search
CPC ........ H04L 67/10; H04L 67/148; H04L 67/34
See application file for complete search history.

(56) References Cited

U.S. PATENT DOCUMENTS

2020/0351745 A1* 11/2020 Alnas et al. .......... H04W 36/28

FOREIGN PATENT DOCUMENTS

| CN | 105975330 A | 9/2016 |
|---|---|---|
| CN | 106844051 A | 6/2017 |

(Continued)

OTHER PUBLICATIONS

International Search Report for Application No. PCT/CN2019/084668, dated Jul. 31, 2019, 4 pages.

(Continued)

*Primary Examiner* — Suraj M Joshi
(74) *Attorney, Agent, or Firm* — Morgan, Lewis & Bockius LLP

(57) ABSTRACT

Provided are a method and apparatus for transferring an edge computing application. The method includes: receiving, by a first edge computing application of a first edge computing host, a first message sent by an edge computing platform of the first edge computing host, where the first message includes edge computing application information of a second edge computing host; and sending, by the first edge computing application, a second message to a second edge computing application of the second edge computing host according to the edge computing application information of the second edge computing host, where the second message carries user context information.

16 Claims, 9 Drawing Sheets

(56) References Cited

FOREIGN PATENT DOCUMENTS

| | | | |
|---|---|---|---|
| CN | 107018539 | A | 8/2017 |
| CN | 107113662 | A | 8/2017 |
| CN | 107305502 | A | 10/2017 |
| CN | 107872823 | A | 4/2018 |
| CN | 108028783 | A | 5/2018 |
| CN | 108029053 | A | 5/2018 |
| CN | 108029062 | A | 5/2018 |
| WO | WO-2017039806 | A1 | 3/2017 |
| WO | WO-2017066945 | A1 | 4/2017 |
| WO | WO-2017128702 | A1 | 8/2017 |
| WO | WO-2017129742 | A1 | 8/2017 |
| WO | WO-2017182000 | A1 | 10/2017 |
| WO | WO-2017206001 | A1 | 12/2017 |

OTHER PUBLICATIONS

Chinese Office Action for Application No. 201810517227.1, dated Aug. 27, 2021, 21 pages including translation.
Chinese Supplemental Search Report for Application No. 201810517227.1, dated Jan. 17, 2022, 4 pages including translation.
Extended European Search Report for Application No. 19806392.7, dated Jan. 17, 2022, 12 pages.
Wu, Yunxiao, et al., "Research on 5G Oriented Edge Computing Platform and Application Interface", 5CJFD, China Unicom Network Technology Research Institute, Beijing, 100048, China, doi:10.12045/j.issn.1007-3043.2017.03.003.

\* cited by examiner

METHOD AND APPARATUS FOR TRANSFERRING AN EDGE COMPUTING APPLICATION

CROSS-REFERENCES TO RELATED APPLICATIONS

This application is a national stage application filed under 35 U.S.C. 371 based on International Patent Application No. PCT/CN2019/084668, filed on Apr. 26, 2019, which claims priority to Chinese Patent Application No. 201810517227.1 filed with the CNIPA on May 25, 2018, disclosures of which are incorporated herein by reference in their entireties.

TECHNICAL FIELD

Embodiments of the present disclosure relate to, but are not limited to, the field of edge computing, and in particular, relate to a method and apparatus for transferring an edge computing application.

BACKGROUND

The explosion development of new services is driving the evolution of network technologies, among which, in the 5G era, the Internet of Everything, ultra-low latency and ultra-high bandwidth services have become the driving force for the network evolution. In the future, the main challenges that the network will face include: (1) ultra-low-latency requirements: the future major services of the mobile Internet (including high-definition video or ultra-definition video, virtual reality or augmented reality, Internet of Things, Internet of Vehicles, etc.) all require the network to provide the transmission guarantee of ultra-low-latency and ultra-high-bandwidth; and (2) problems of transmission cost and efficiency due to exponential data: the Internet of Everything generates massive connections of the Internet of Things and the massive connections generate massive data, so the transmission of the massive data to a cloud for centralized processing will impose a huge burden on the network, and thus making the operation of computing and processing extend to the data generation place becomes a trend.

The edge computing hosts applications (APPs) concentrated in the data center to the edge of the network and makes these APPs closer to consumers and data sources, and thus has ultra-low latency, ultra-high bandwidth and other features, and is an integrated carrier platform for the combination of information technology (IT) and communication technology (CT) services. FIG. 1 is a schematic diagram of a basic framework of edge computing. As shown in FIG. 1, in the framework, at a macro level, different functional entities in the Mobile Edge Computing (MEC) (also known as Multi-access Edge Computing (MEC)) are classified into three levels, i.e., a network level, an edge computing host level, and an edge computing system level.

The edge computing host level includes an edge computing host and a corresponding management entity of the edge computing host level, and the edge computing host may be further divided into an edge computing platform, an edge computing application and a virtualized infrastructure (i.e., virtual architecture).

The network level mainly includes relevant external entities such as the 3GPP cellular network, local network and external network, and this layer mainly represents the access condition of the edge computing working system to a local area network, cellular mobile network or external network.

The management entities at the edge computing system level are responsible for the global control of the edge computing system.

At present, several modes of triggering the transfer of edge computing applications are described in the mobile edge computing protocol of the European Telecommunications Standards Institute (ETSI), all of the modes rely on centralized processing of the edge computing orchestrator and are subject to a decision process by the edge computing orchestrator. However, for service providers, exposing application information or user information to the edge computing orchestrator means being more uncontrollable and insecure.

SUMMARY

Embodiments of the present disclosure provide a method and apparatus for transferring an edge computing application, so as to improve the security.

The embodiments of the present disclosure provide a method for transferring an edge computing application. The method includes steps described below.

A first edge computing application of a first edge computing host receives a first message sent by an edge computing platform of the first edge computing host, where the first message includes edge computing application information of a second edge computing host.

The first edge computing application sends a second message to a second edge computing application of the second edge computing host according to the edge computing application information of the second edge computing host, where the second message carries user context information.

The embodiments of the present disclosure provide a method for transferring an edge computing application. The method includes steps described below.

An edge computing platform manager receives a first message, where the first message carries application instance information; and the edge computing platform manager performs an application instantiation operation on an edge computing host according to the application instance information.

The embodiments of the present disclosure provide a method for transferring an edge computing application. The method includes steps described below.

A first edge computing application of a first edge computing host receives a first message of a second edge computing application of a second edge computing host, where the first message carries user context information.

The embodiments of the present disclosure provide a method for transferring an edge computing application. The method includes steps described below.

An edge computing orchestrator receives a first message sent by a first edge computing host, where the first message carries user information.

The edge computing orchestrator sends a second message to an edge computing platform manager according to the user information, where the second message includes application instance information.

The embodiments of the present disclosure provide an apparatus for transferring an edge computing application. The apparatus includes an edge computing platform and a first edge computing application.

The edge computing platform is configured to send a first message to a first edge computing application, where the first message includes edge computing application information of a second edge computing host.

The first edge computing application is configured to receive the first message sent by an edge computing platform of a first edge computing host, and send a second message to a second edge computing application of the second edge computing host, where the second message carries user context information.

The embodiments of the present disclosure provide an apparatus for transferring an edge computing application. The apparatus includes a receiving module and an instantiation module.

The receiving module is configured to receive a first message, where the first message carries application instance information.

The instantiation module is configured to perform an edge computing application operation on an edge computing host according to the application instance information.

The embodiments of the present disclosure provide an apparatus for transferring an edge computing application. The apparatus includes a first edge computing application.

The first edge computing application is configured to receive a first message of a second edge computing application of a second edge computing host, where the first message carries user context information.

The embodiments of the present disclosure provide an apparatus for transferring an edge computing application. The apparatus includes a receiving module and a sending module.

The receiving module is configured to receive a first message sent by a first edge computing host, where the first message carries user information.

The sending module is configured to send a second message to an edge computing platform manager, where the second message carries application instance information.

The embodiments of the present disclosure provide an apparatus for transferring an edge computing application, including a processor and a computer-readable storage medium storing instructions that, when executed by the processor, implement any method for transferring an edge computing application described above.

The embodiments of the present disclosure provide a computer-readable storage medium storing a computer program which is configured to, when executed by a processor, implement steps of any method for transferring an edge computing application described above.

The embodiments of the present disclosure provide a system for transferring an edge computing application. The system includes a first edge computing host and a second edge computing host.

A first edge computing application of the first edge computing host is configured to receive a first message sent by a first edge computing platform of the first edge computing host, where the first message includes edge computing application information of the second edge computing host, and send a second message to a second edge computing application of the second edge computing host according to the edge computing application information of the second edge computing host, where the second message carries user context information.

The second edge computing application of the second edge computing host is configured to receive the second message of the first edge computing application.

The embodiments of the present disclosure include that: a first edge computing application of a first edge computing host receives a first message sent by a first edge computing platform of the first edge computing host, where the first message includes edge computing application information of a second edge computing host, and sends a second message to a second edge computing application of the second edge computing host according to the edge computing application information of the second edge computing host, where the second message carries user context information. The transfer of an edge computing application is initiated by an edge computing application of an edge computing host, and user context information directly passes through between edge computing platforms of the edge computing hosts, so that the user context information will not be exposed to the edge computing platforms and an edge computing orchestrator, improving the security of the user context information.

Other features and advantages of the embodiments of the present disclosure will be set forth in the description which follows, and in part will be apparent from the description, or may be learned by the practice of the present disclosure. The objectives and other advantages of the present disclosure will be realized and attained by the structure particularly pointed out in the written description, claims and drawings.

BRIEF DESCRIPTION OF DRAWINGS

The drawings are used to provide a further understanding of solutions of the embodiments of the present disclosure, constitute a part of the specification, explain the solutions of the present disclosure in conjunction with the embodiments of the present disclosure, and do not limit the solutions of the embodiments of the present disclosure.

DETAILED DESCRIPTION

Embodiments of the present disclosure will be described below in detail in conjunction with the drawings. It is to be noted that if not in collision, the embodiments described herein and the features thereof may be combined with each other.

The steps illustrated in the flowcharts among the drawings may be performed by, for example, a computer system capable of executing a set of computer-executable instructions. Moreover, although logical sequences are illustrated in the flowcharts, the illustrated or described steps may be performed in sequences different from those described herein in some cases.

In the embodiments of the present disclosure, the terms "first" and "second" are only used for distinguishing different messages or execution subjects, and are not intended to limit the specific sequence.

Figure 1:
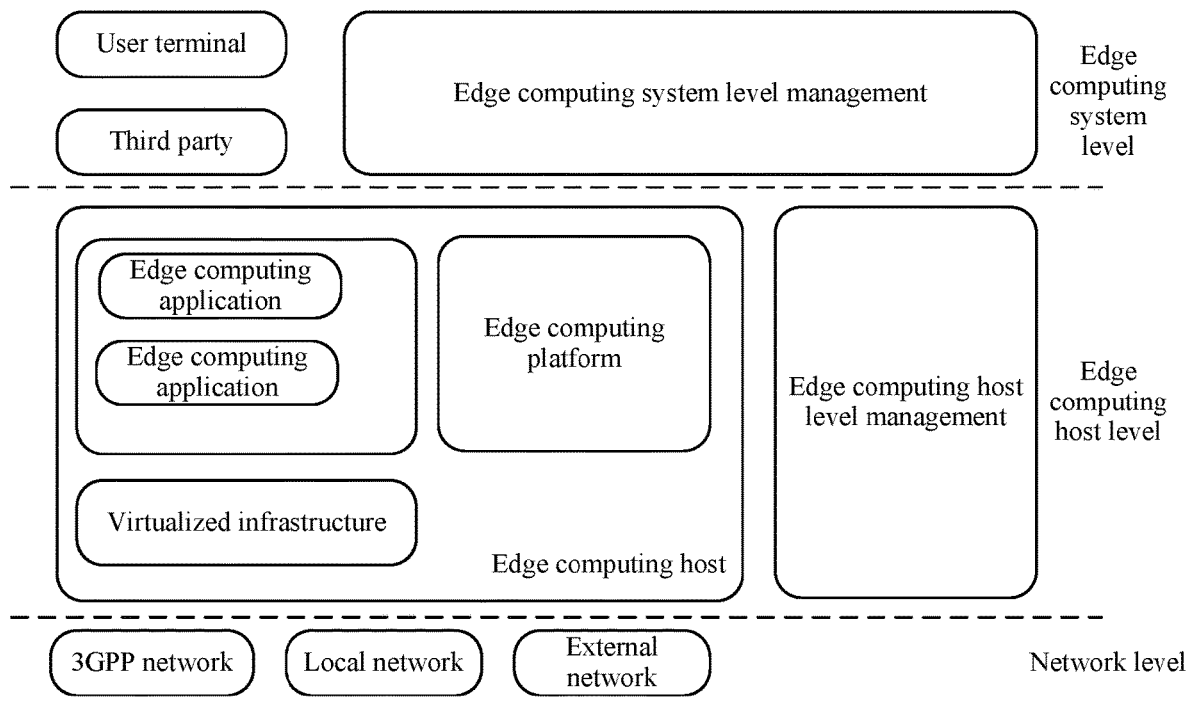
FIG. 1 is a schematic diagram of a basic framework of edge computing.
Figure 2:
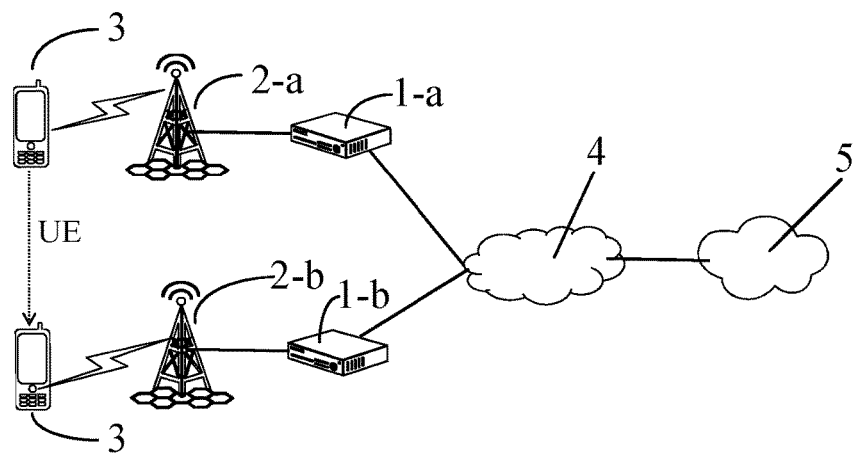
FIG. 2 is a schematic diagram of an edge computing system according to an embodiment of the present disclosure.

FIG. 2 is a schematic diagram of an edge computing system according to an embodiment of the present disclosure. As shown in FIG. 2, the system includes a base station 2, at least one user equipment (UE), an edge computing host 1, a core network 4 and the Internet 5. The base station 2 may wirelessly communicate with each UE 3 via one or more base station antennas. Each base station 2 may provide communication coverage for a respective geographic area. In some embodiments, the base station 2 can also be referred to as a base station transceiver, a radio base station, an access point, a radio transceiver, a Node B, an evolved Node B (eNode B or eNB), a 5G base station (gNB), a Home Node B, a home evolved Node B, or some other suitable terminology. In the 3rd Generation Partnership Project (3GPP), the term "cell" may be used to describe a base station, a carrier, part of carriers associated with a base station, or a coverage area of a carrier/base station (e.g., sector, etc.), which needs to be determined according to context. Therefore, in the embodiments of the present disclosure, the concepts of the base station and the cell will not be clearly distinguished without any ambiguity or confusion caused, and they may refer to the same concept, and those skilled in the art may determine their specific meaning according to the context.

UEs 3 are dispersed throughout the whole wireless network, and each UE may be fixed or mobile. The UE 3 may also be referred to as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handheld device, a user agent, a mobile client, a client, or some other suitable terminology by those skilled in the art. The UE 3 may be a cellular phone, a personal digital assistant (PDA), a wireless modem, a wireless communication device, a handheld device, a tablet computer, a cordless phone, a wireless local loop (WLL) station, an Internet of things terminal, and so on. Furthermore, in the embodiments of the present disclosure, the concepts of the user and the UE will not be clearly distinguished without any ambiguity or confusion caused, and they may refer to the same concept, and those skilled in the art may determine their specific meaning according to the context.

The edge computing application is also referred to an edge computing application instance, or a mobile edge application, or a fog computing application, or a micro cloud application, or the like.

The edge computing host 1 may also referred to an edge computing server or a mobile edge computing host or a mobile edge computing server or a fog computing server or a micro cloud server, may be deployed in multiple locations in the network, for example, may be located on a base station side, a 3G radio network controller (RNC) side, a multi-radio access technology (multi-RAN) cellular convergence point side, or a core network edge. FIG. 2 shows merely one of the deployment manners, and those skilled in the art may be aware that the embodiments of the present disclosure may also be applicable to other deployment manners. In the deployment manner illustrated in FIG. 2, the base station 2-*a* obtains edge computing services from the edge computing host 1-*a* and the base station 2-*b* obtains edge computing services from the edge computing host 1-*b*. The edge computing host 1-*a* and the edge computing host 1-*b* are connected to the Internet 5 via the core network 4.

Figure 5:
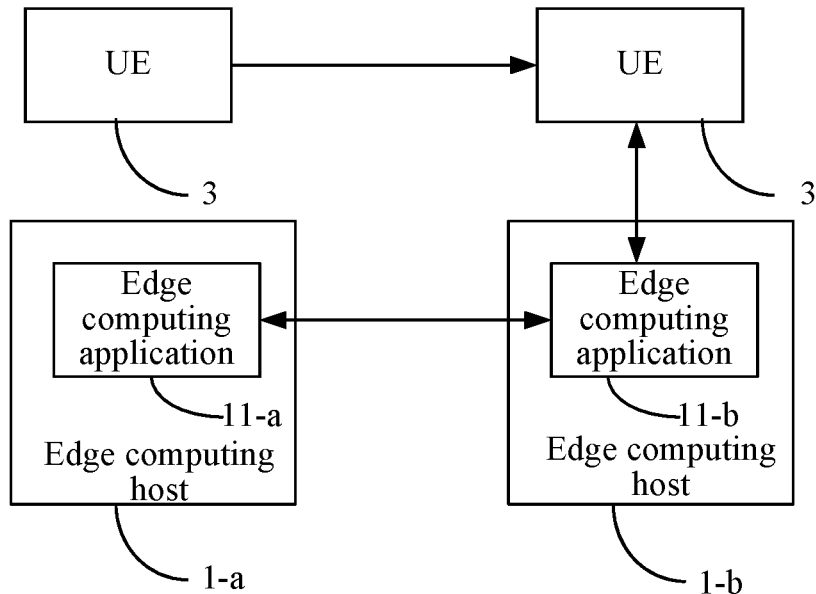
FIG. 5 is a schematic diagram of edge computing application transfer according to an embodiment of the present disclosure.

When the UE 3 moves from the range of services provided by one edge computing host to the range of services provided by another edge computing host, the edge computing application providing services on the mobile edge host needs to be transferred so as to provide better services to the user. As shown in FIG. 5, the UE 3 first attaches to the base station 2-*a* and obtains edge computing application services from the edge computing host 1-*a*. When the UE 3 moves from the coverage of the base station 2-*a* to the coverage of the base station 2-*b*, the edge computing application services provided for the UE 3 needs to be transferred from the edge computing host 1-*a* to the edge computing host 1-*b*. Context information of the UE 3 needs to be transferred from the edge computing host 1-*a* to the edge computing host 1-*b*.

Figure 3:
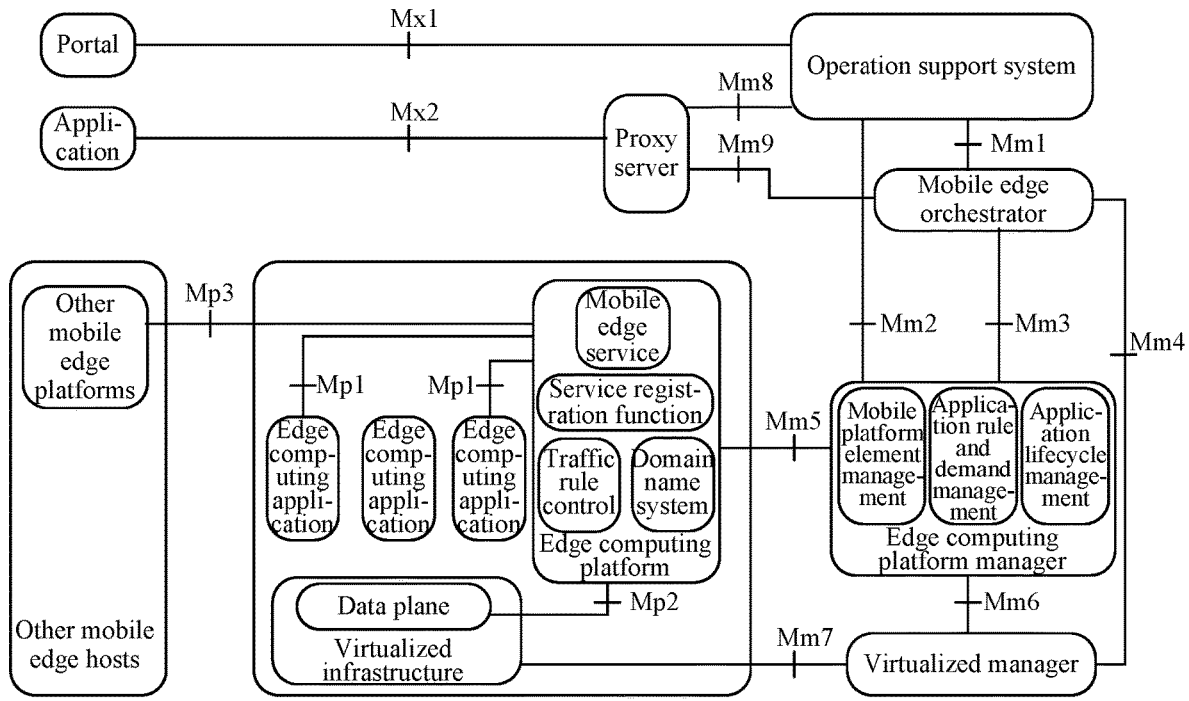
FIG. 3 is a schematic diagram of an architecture of edge computing according to an embodiment of the present disclosure.

The ETSI MEC working group defines the architecture of the edge computing, as shown in FIG. 3. In FIG. 3, Mp represents reference points related to edge computing applications, Mm represents reference points related to management, and Mx represents reference points related to external entities.

Figure 4:
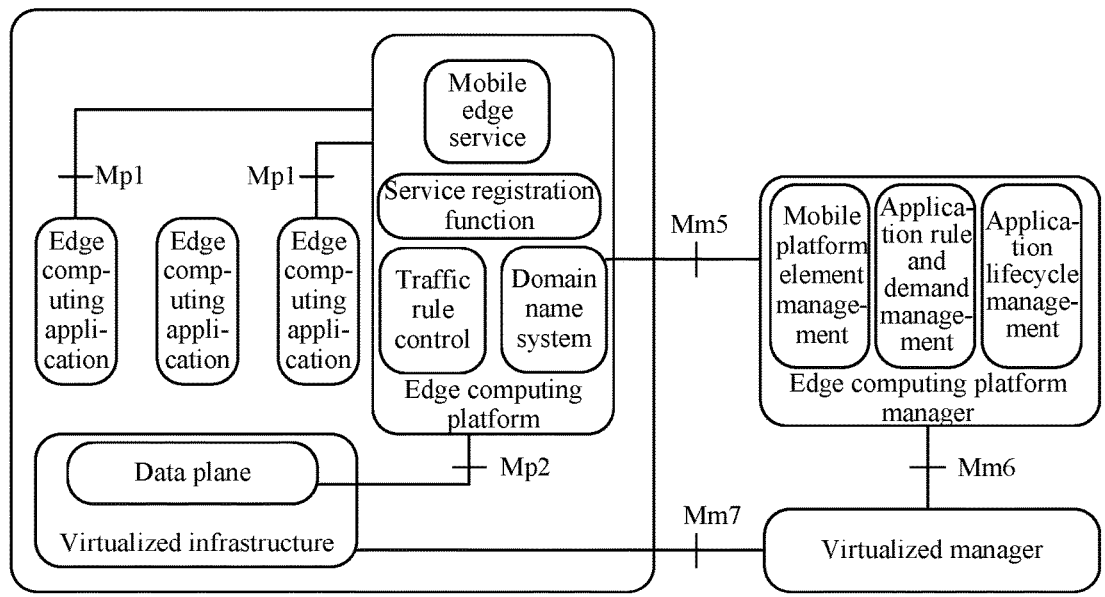
FIG. 4 is a structural diagram of an edge computing host according to an embodiment of the present disclosure.

In this architecture, as shown in FIG. 4, the edge computing host includes: edge computing applications, an edge computing platform and a virtualized infrastructure.

In an embodiment, the edge computing host may also include an edge computing platform manager.

In other embodiments, the edge computing platform manager may also be a network element independent of the edge computing host.

The virtualized infrastructure provides computing, storage and network resources for the edge computing applications. The virtualized infrastructure includes a data plane which is configured to execute forwarding rules for data received from the edge computing platform.

The edge computing applications run on the virtualized infrastructure and can interact with the edge computing platform, consume, and provide mobile edge services.

The edge computing platform receives a forwarding rule from the edge computing platform manager, the edge computing applications or the mobile edge service, and issues instructions to the data plane based on the forwarding rule.

The edge computing platform also supports the configuration of domain name system (DNS) proxy servers, which can redirect data traffic to corresponding applications and services, and also can communicate with other edge computing platforms through the Mp3 reference point. The Mp3 reference point can be used as the basis for interconnection of different edge computing platforms in the collaboration mechanism of distributed MEC systems.

The mobile edge orchestrator (MEO), also called the edge computing orchestrator or the fog computing orchestrator or the micro cloud orchestrator, implements the core functions of the edge computing system level management, such as mastering the panorama of the mobile edge system, loading APP packages, selecting an appropriate edge computing host for application instantiation, performing application transfer and so on.

The edge computing platform manager, also known as the mobile edge platform manager, the fog computing platform manager, the micro cloud platform manager, or other equivalent concepts, manages the APP lifecycle (including notifying the mobile edge orchestrator of application-related events), provides an element management function for the edge computing platform, and manages edge computing application rules and requests.

As shown in FIG. 5, when the context information of the UE 3 needs to be transferred from the edge computing host 1-a to the edge computing host 1-b, it can be transferred from the edge computing application 11-a of the edge computing host 1-a to the edge computing application 11-b of the edge computing host 1-b, so that the context information of the UE 3 does not pass through the edge computing orchestrator, nor does it need to expose application information or user information to the edge computing orchestrator, ensuring the security of the information.

Figure 6:
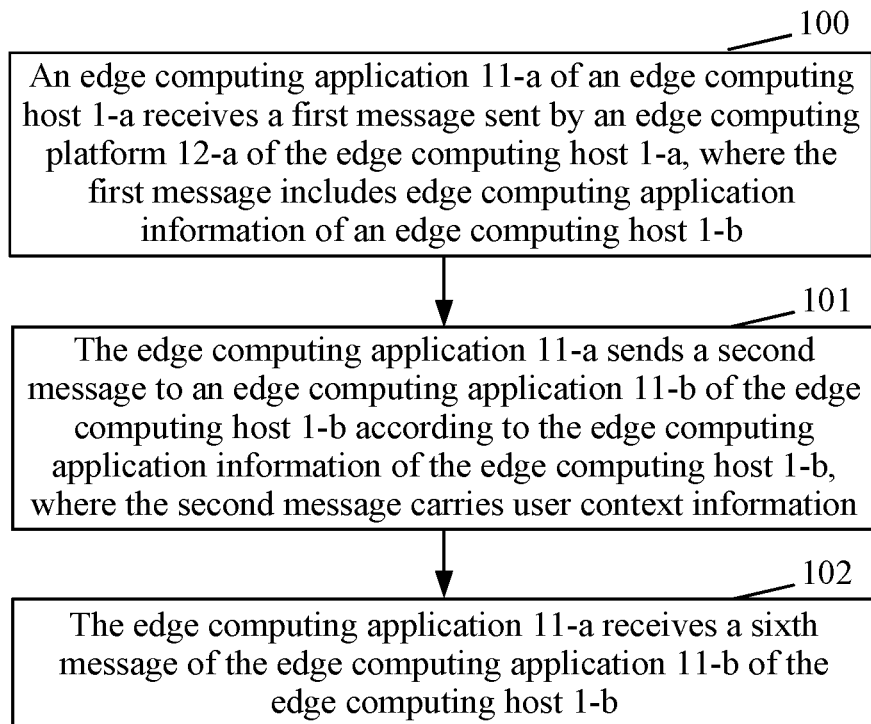
FIG. 6 is a flowchart of a method for transferring an edge computing application according to an embodiment of the present disclosure.

With reference to FIG. 6, a method for transferring an edge computing application provided by an embodiment of the present disclosure includes steps 100 and 101.

In step 100, an edge computing application 11-a of an edge computing host 1-a receives a first message sent by an edge computing platform 12-a of the edge computing host 1-a, where the first message includes edge computing application information of an edge computing host 1-b.

In this embodiment, the first message may be a response message, such as an application instance transfer response message, an edge computing application response message or other response messages.

In another embodiment, the first message may also be a request message, such as a user context transfer trigger request message, a user state transfer trigger request message or other request messages.

The first message does not include user context information, and is only used for triggering a user context information transfer operation.

In step 101, the edge computing application 11-a sends a second message to an edge computing application 11-b of the edge computing host 1-b according to the edge computing application information of the edge computing host 1-b, where the second message carries user context information.

In this embodiment, the second message may be a user context transfer request.

In this embodiment, exemplarily, an edge computing application 11-a of an edge computing host 1-a sends a second message to an edge computing platform 12-a of the edge computing host 1-a, the edge computing platform 12-a of the edge computing host 1-a sends the second message to an edge computing platform 12-b of an edge computing host 1-b via an Mp3 interface, and the edge computing platform 12-b of the edge computing host 1-b sends the second message to an edge computing application 11-b of the edge computing host 1-b; in other words, the second message is transparent to the edge computing platform, and the edge computing platform does not need to know what the information included in the second message is, thereby improving the security of the user context information.

Alternatively, the edge computing platform 12-a of the edge computing host 1-a sends the second massage to the edge computing platform 12-b of the edge computing host 1-b according to the edge computing application information of the edge computing host 1-b.

In another embodiment, before a first edge computing application of a first edge computing host receives a first message sent by an edge computing platform of the first edge computing host, the method further includes the step described below.

The edge computing application 11-a of the edge computing host 1-a sends a third message to the edge computing platform 12-a, where the third message carries user information.

The user information includes at least one of: location information of a user, or information for identifying a user application.

The information for identifying a user application includes any one of: an application description identification, a package identification, or other information which can be mapped into the application description identification or the package identification (e.g., an edge computing application identification).

The location information is identified by an identification of a cell to which the UE belongs (e.g., an evolved universal terrestrial radio access network (E-UTRAN) cell global identifier (ECGI) or a new radio (NR) cell global identifier (NCGI)), or is identified by current location coordinates of the UE.

The edge computing application 11-a of the edge computing host 1-a may send the third message to the edge computing platform, when it is determined that the user is not within the service range of the edge computing host 1-a, or when handover is needed, such as when the service quality of the current edge computing host is poor, or for other reasons. For example, the third message may be a request message (e.g., an application instance transfer request message, an edge computing application request message, or other request messages).

In the mobile network, for example, the 4G or 5G network, when a user equipment (UE) moves from an area served by a cell A to an area served by a cell B, the handover occurs in a case where certain conditions are met, that is, the UE switches the attachment relationship from the cell A to the cell B. In this case, the edge computing application 11-a with services provided in the edge computing host 1-a would know that the UE 3 has left the service range of the edge computing host 1-a based on the services provided by the edge computing platform 12-a of the edge computing host 1-a.

The services provided by the edge computing platform 12-a of the edge computing host 1-a include the wireless network information service and the location service. The cell handover event of the UE can be known through wireless network information provided by the wireless network service, and the location change of the UE can be known through the location information provided by the location service.

In another embodiment, before the first edge computing application of the first edge computing host receives the first message sent by the edge computing platform of the first edge computing host, the method further includes the step described below.

The edge computing host 1-*a* sends a fourth message to an edge computing orchestrator 6, where the fourth message includes user information. The fourth message may be a request message, and for example, may be an application transfer request message, or an edge computing application request message or other request messages. More specifically, the edge computing host 1-*a* sending the fourth message to the edge computing orchestrator 6 is that the edge computing platform 12-*a* of the edge computing host 1-*a* sends the fourth message to the edge computing orchestrator 6 via an edge computing platform manager 13-*a*. Other descriptions about the edge computing host sending a message to the edge computing orchestrator all refer to that the edge computing platform of the edge computing host sends the message to the edge computing orchestrator via the edge computing platform manager.

It is to be noted that the edge computing application 11-*a* of the edge computing host 1-*a* can send the fourth message to the edge computing orchestrator 6 after sending the third message to the edge computing platform 12-*a*, or the edge computing platform 12-*a* directly sends the fourth message to the edge computing orchestrator 6.

In another embodiment, before the first edge computing application of the first edge computing host receives the first message sent by the edge computing platform of the first edge computing host, the method further includes the step described below.

The edge computing host 1-*a* receives a fifth message sent by the edge computing orchestrator 6, where the fifth message includes the edge computing application information of the edge computing host 1-*b*.

The fifth message may be a response message, and for example, may be an application transfer response message, or an edge computing application response message or other response messages.

More specifically, the edge computing host 1-*a* receiving the fifth message sent by the edge computing orchestrator 6 is that the edge computing platform 12-*a* of the edge computing host 1-*a* receives the fifth message sent by the edge computing orchestrator 6 via the edge computing platform manager 13-*a*. Other descriptions about the edge computing host receiving a message sent by the edge computing orchestrator all refer to that the edge computing platform of the edge computing host receives the message sent by the edge computing orchestrator via the edge computing platform manager.

In this embodiment, the edge computing platform 12-*a* can acquire the edge computing application information of the edge computing host 1-*b* from information stored by itself according to the user information; or requests to acquire the edge computing application information of the edge computing host 1-*b* from other network element (e.g., the edge computing orchestrator 6).

The edge computing platform 12-*a* subscribes to edge computing application information of a peripheral edge computing host, and when the edge computing application information of the peripheral edge computing host changes, receives a notification message sent by the peripheral edge computing host.

Figure 7A:
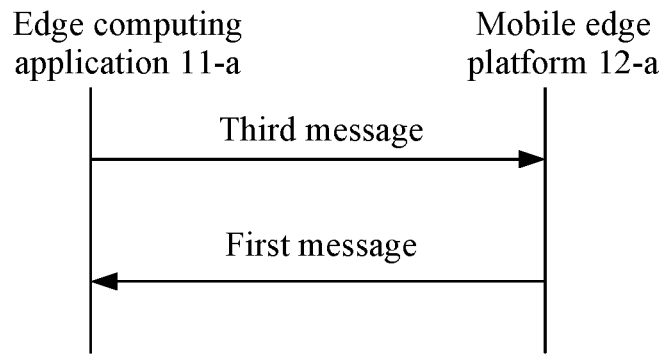
FIG. 7A is a flowchart one of a method for acquiring edge computing application information of second edge computing according to an embodiment of the present disclosure.

When the edge computing platform 12-*a* acquires the edge computing application information of the edge computing host 1-*b* from the information stored by itself according to the user information, with reference to FIG. 7A, the edge computing application 11-*a* of the edge computing host 1-*a* sends the third message to the edge computing platform 12-*a* of the edge computing host 1-*a*; and the edge computing application 11-*a* of the edge computing host 1-*a* receives the first message of the edge computing platform 12-*a* of the edge computing host 1-*a*; where the first message includes the edge computing application information of the edge computing host 1-*b*.

Figure 7B:
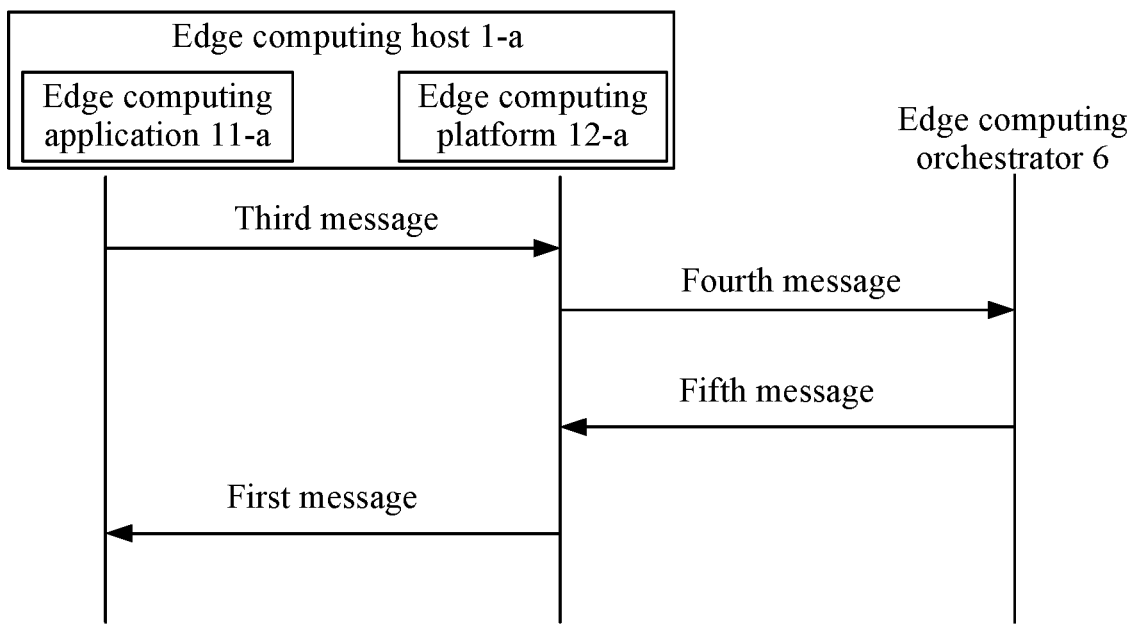
FIG. 7B is a flowchart two of a method for acquiring edge computing application information of second edge computing according to an embodiment of the present disclosure.

When the edge computing platform 12-*a* requests to acquire the edge computing application information of the edge computing host 1-*b* from other network elements (e.g., the edge computing orchestrator 6), with reference to FIG. 7B, the edge computing application 11-*a* of the edge computing host 1-*a* sends the third message to the edge computing platform 12-*a* of the edge computing host 1-*a*, and the edge computing platform 12-*a* of the edge computing host 1-*a* sends the fourth message to the edge computing orchestrator 6; and the edge computing platform 12-*a* of the edge computing host 1-*a* receives the fifth message of the edge computing orchestrator 6 and sends the first message to the edge computing application 11-*a* of the edge computing host 1-*a*; where the first message includes the edge computing application information of the edge computing host 1-*b*.

In an embodiment, after receiving the fourth message, the edge computing orchestrator 6 sends an application instantiation request to the edge computing platform manager 13-*b* according to the user information, the edge computing platform manager 13-*b* triggers an application instantiation operation performed on the edge computing host 1-*b*, and after the application instantiation operation performed on the edge computing host 1-*b* is completed, the edge computing orchestrator 6 sends the fifth message to the edge computing host 1-*a* via the edge computing platform manager 13-*b*.

In an embodiment, the edge computing platform 12-*a* of the edge computing host 1-*a* sends the first message to the edge computing application 11-*a* of the edge computing host 1-*a* via an Mp1 interface, and the first message sent by the edge computing platform 12-*a* of the edge computing host 1-*a* via the Mp1 interface to the edge computing application 11-*a* of the edge computing host 1-*a* needs to include the edge computing application information of the edge computing host 1-*b*.

In the embodiments of the present disclosure, the edge computing application information of the edge computing host 1-*b* includes at least one of: address information of the edge computing host 1-*b*, port information used by the edge computing application 11-*b* of the edge computing host 1-*b*, or edge computing application identification information of the edge computing host 1-*b*.

The address information of the edge computing host 1-*b* is identified by an Internet protocol (IP) address, a media access control (MAC) address, or a tunnel identification.

In another embodiment, the first message or the fifth message further includes at least one of: minimum delay information for initiating a user context information synchronization operation, or validity period information of a user context information synchronization operation.

Optionally, after the edge computing application 11-*a* sends the second message to the edge computing application 11-*b* of the edge computing host 1-*b* according to the edge computing application information of the edge computing host 1-*b*, the method further includes the step 102.

In step 102, the edge computing application 11-*a* receives a sixth message of the edge computing application 11-*b* of the edge computing host 1-*b*.

In this embodiment, the sixth message may be a user context transfer response.

In this embodiment, exemplarily, the edge computing application 11-*b* of the edge computing host 1-*b* sends the sixth message to the edge computing platform 12-*b* of the edge computing host 1-*b*, the edge computing platform 12-*b* of the edge computing host 1-*b* sends the sixth message to the edge computing platform 12-*a* of the edge computing host 1-*a* via the Mp3 interface, and the edge computing platform 12-*a* of the edge computing host 1-*a* sends the sixth message to the edge computing application 11-*a* of the edge computing host 1-*a*.

In another embodiment, after the edge computing application 11-*a* sends the second message to the edge computing application 11-*b* of the edge computing host 1-*b* according to the edge computing application information of the edge computing host 1-*b*, the method further includes the step: the edge computing host 1-*a* terminates the edge computing application 11-*a* of the edge computing host 1-*a*.

In another embodiment, the method further includes the step described below.

After the edge computing application 11-*a* of the edge computing host 1-*a* receives the sixth message sent by the edge computing application 11-*b* of the edge computing host 1-*b*, the method further includes the step described below.

The edge computing application 11-*a* of the edge computing host 1-*a* receives a seventh message sent by the edge computing platform 12-*a* of the edge computing host 1-*a*.

The seventh message may be a response message, and for example, may be a user context transfer trigger response message.

In another embodiment, the first message or the fifth message further includes at least one of: minimum delay information for initiating a user context information synchronization operation, or validity period information of a user context information synchronization operation.

The method includes at least one of steps described below.

The edge computing host 1-*a* sends the third message after time indicated by the minimum delay information.

The edge computing host 1-*a* receives the sixth message within time indicated by the validity period information.

In other words, the edge computing host 1-*a* initiates a user context information synchronization operation after the time indicated by the minimum delay information for initiating the user context information synchronization operation, and completes the user context information synchronization operation within the time indicated by the validity period information of the user context information synchronization operation.

In the embodiments of the present disclosure, the edge computing application 11-*a* of the edge computing host 1-*a* initiates the transfer of an edge computing application and initiates user context transfer, and then user context information directly passes through between edge computing platforms of the edge computing hosts, so that the user context information will not be exposed to the edge computing platforms and the edge computing orchestrator, improving the security of the user context information.

Figure 8:
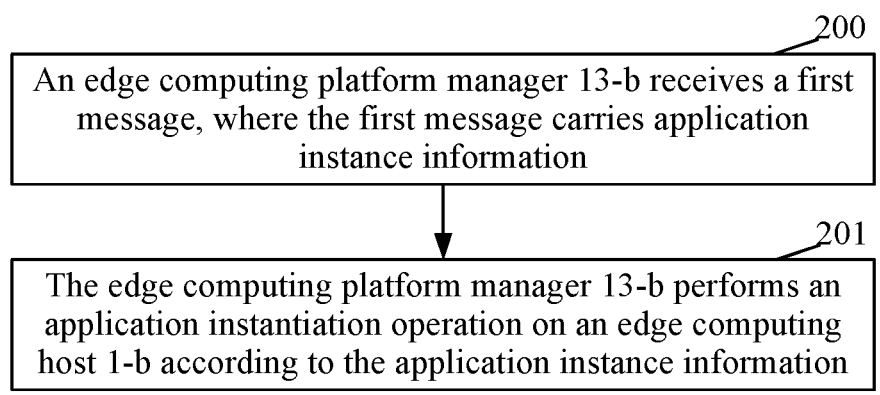
FIG. 8 is a flowchart of a method for transferring an edge computing application according to another embodiment of the present disclosure.

With reference to FIG. 8, another embodiment of the present disclosure provides a method for transferring an edge computing application, and the method includes steps 200 and 201.

In step 200, an edge computing platform manager 13-*b* receives a first message, where the first message carries application instance information.

In this embodiment, the first message may be an instantiation operation request.

In this embodiment, the application instance information includes at least one of: an application identification, a package identification, or a package description identification.

In step 201, the edge computing platform manager 13-*b* performs an application instantiation operation on an edge computing host 1-*b* according to the application instance information.

In another embodiment, after the edge computing platform manager 13-*b* performs the application instantiation operation on the edge computing host 1-*b* according to the application instance information, the method further includes the step described below.

The edge computing platform manager 13-*b* sends a second message to an edge computing orchestrator 6, where the second message includes at least one of: minimum delay information for initiating a user context information synchronization operation, validity period information of a user context information synchronization operation, or edge computing application information of the edge computing host 1-*b*.

In this embodiment, the second message may be an application instantiation response.

Figure 9:
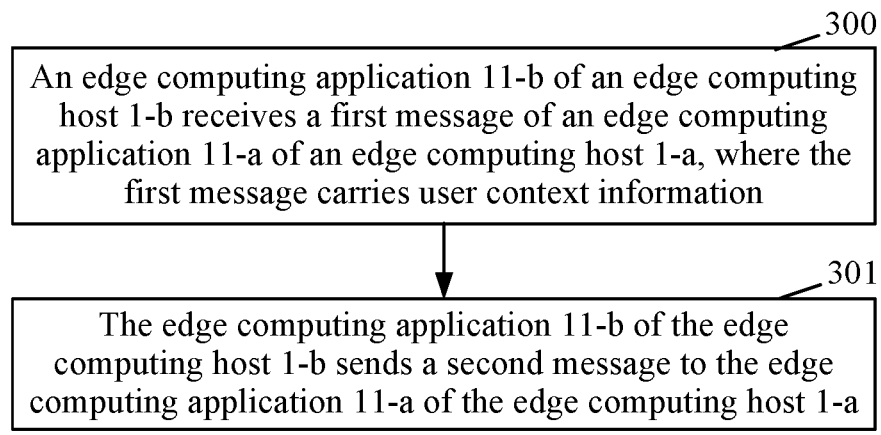
FIG. 9 is a flowchart of a method for transferring an edge computing application according to another embodiment of the present disclosure.

With reference to FIG. 9, another embodiment of the present disclosure provides a method for transferring an edge computing application provided, and the method includes the step 300.

In step 300, an edge computing application 1-*b* of an edge computing host 1-*b* receives a first message of an edge computing application 11-*a* of an edge computing host 1-*a*, where the first message carries user context information. Exemplarily, the edge computing application 11-*b* receives the first message via an edge computing platform 12-*b*.

In this embodiment, the first message may be a user context transfer request.

In another embodiment, the method further includes the step 301.

In step 301, the edge computing application 11-*b* of the edge computing host 1-*b* sends a second message to the edge computing application 11-*a* of the edge computing host 1-*a*. Exemplarily, the edge computing application 11-*b* sends the second message via the edge computing platform 12-*b*.

In this embodiment, the second message may be a user context transfer response.

Figure 10:
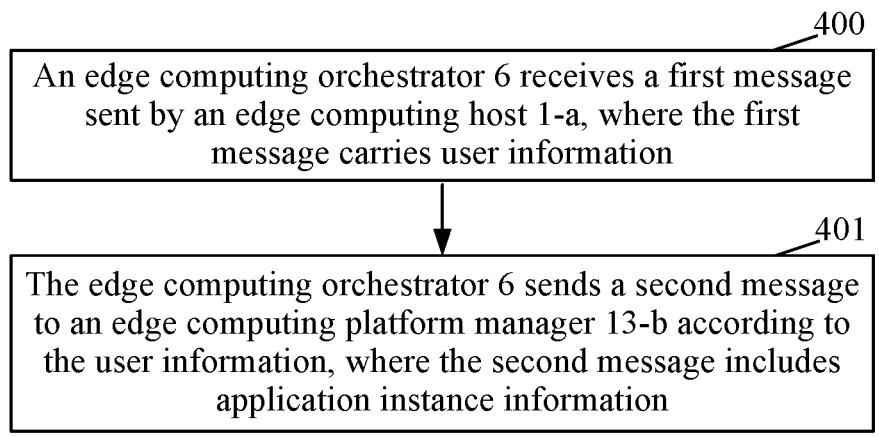
FIG. 10 is a flowchart of a method for transferring an edge computing application according to another embodiment of the present disclosure.

With reference to FIG. 10, another embodiment of the present disclosure provides a method for transferring an edge computing application, and the method includes steps 400 and 401.

In step 400, an edge computing orchestrator 6 receives a first message sent by an edge computing host 1-*a*, where the first message carries user information.

In this embodiment, the first message may be a request message, such as an application instance transfer request message, an edge computing application request message or other request messages.

In step 401, the edge computing orchestrator 6 sends a second message to an edge computing platform manager 13-*b* according to the user information, where the second message includes application instance information.

In this embodiment, the application instance information includes at least one of: an application identification, a package identification, or a package description identification.

In this embodiment, the edge computing orchestrator 6 determines an edge computing host 1-*b* according to the user information, and sends the second message to the edge computing platform manager 13-*b*. The second message may be an application instantiation request.

In another embodiment, after the edge computing orchestrator 6 sends the second message to the edge computing platform manager 13-*b* according to the user information, the method further includes the following steps: the edge computing orchestrator 6 receives a third message sent by the edge computing platform manager 13-*b*, and sends a fourth message to the edge computing host 1-*a*.

The third message may be an application instantiation response.

The fourth message may be a response message.

The specific implementation of the method for implementing edge computing application transfer provided in the embodiments of the present disclosure will be described below through specific examples.

Example 1

Figure 11:
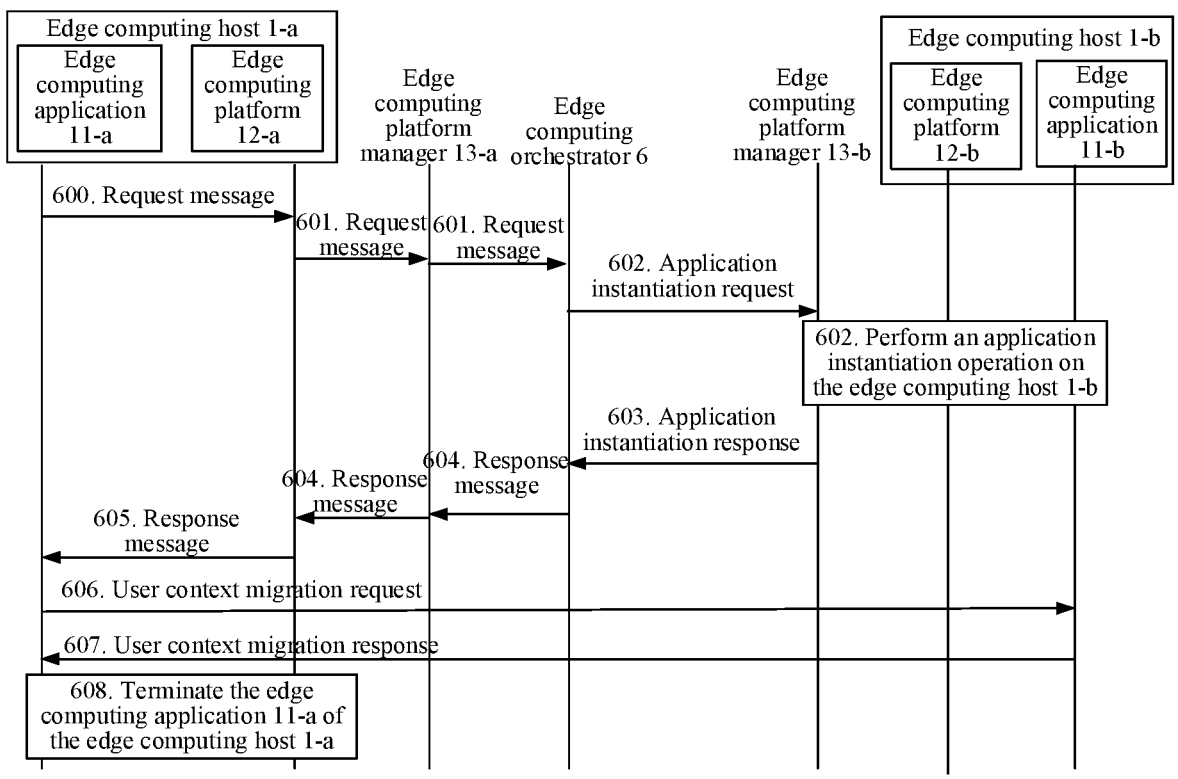
FIG. 11 is a flowchart of an example 1 of a method for transferring an edge computing application according to an embodiment of the present disclosure.

In the mobile network, for example, the 4G or 5G network, when a UE moves from an area served by a cell A to an area served by a cell B, the handover occurs in a case where certain conditions are met, that is, the UE switches the attachment relationship from the cell A to the cell B. Information received by an edge computing application A may be based on services provided by an edge computing host, for example, in the ETSI MEC, an edge computing platform provides several basic services, including the wireless network information service and the location service. The cell handover event of the UE can be known through wireless network information, and the location change of the UE can be known through the location service. The edge computing application A, through services provided by the edge computing platform, knows that the UE has left a current service range of the edge computing host. The edge computing application A may trigger a transfer operation of the edge computing application, and the operation includes steps shown in FIG. 11.

In step 600, an edge computing application 11-*a* of an edge computing host 1-*a* sends a request message to an edge computing platform 12-*a* of the edge computing host 1-*a*.

In this step, the request message may be an application instance transfer request message, an edge computing application transfer request message or other request messages.

The request message includes user information.

The user information includes at least one of: location information of a user, or information for identifying a user application.

The location information is identified by an identification of a cell to which the UE belongs (e.g., ECGI or NCGI), or is identified by an IP address of the cell to which the UE belongs, or an IP address of the UE, or a geographical address of the UE.

The information for identifying a user application, for example, may be an application description identification, or a package identification, or other information which can be mapped into the application description identification or the package identification.

In step 601, the edge computing platform 12-*a* of the edge computing host 1-*a* sends the request message to an edge computing platform manager 13-*a*, and the edge computing platform manager 13-*a* sends the request message to an edge computing orchestrator 6.

In this step, the request message may be an application instance transfer request message, an edge computing application transfer request message or other request messages.

The request message includes user information.

The user information includes at least one of: location information of a user, or information for identifying a user application.

The location information is identified by an identification of a cell to which the UE belongs (e.g., ECGI or NCGI), or an IP address of the cell to which the UE belongs, or an IP address of the UE, or a geographical address of the UE.

The request message may be an application instance transfer request message, an edge computing application transfer request message or other request messages.

In step 602, the edge computing orchestrator 6 determines an edge computing host 1-*b* according to the user information and sends an application instantiation request to an edge computing platform manager 13-*b*, and the edge computing platform manager 13-*b* triggers an application instantiation operation on the edge computing host.

In this step, the application instantiation request includes at least information for identifying a user application.

In step 603, after the edge computing host 1-*b* completes the application instantiation operation, the edge computing platform manager 13-*b* sends an application instantiation response to the edge computing orchestrator 6.

In this embodiment, the application instantiation response includes information of the edge computing application of the edge computing host 1-*b*, and may further include at least one of: minimum delay information for initiating a user context information synchronization operation, or validity period information of a user context information synchronization operation.

In step 604, the edge computing orchestrator 6 sends a response message to the edge computing platform manager 13-*a*, and the edge computing platform manager 13-*a* sends the response message to the edge computing platform 12-*a*.

In this step, the response message, for example, may be an application instance transfer response message, an edge computing application response message or other response messages.

The response message includes edge computing application information of the edge computing host 1-*b*, and may further include at least one of: minimum delay information for initiating a user context information synchronization operation, or validity period information of a user context information synchronization operation.

In step 605, the edge computing platform 12-*a* of the edge computing host 1-*a* sends a response message to the edge computing application 11-*a* of the edge computing host 1-*a*.

In this step, the response message, for example, may be an application instance transfer response message, an edge computing application response message or other response messages.

The response message includes the edge computing application information of the edge computing host 1-*b*, and may further include at least one of: minimum delay information for initiating a user context information synchronization operation, or validity period information of a user context information synchronization operation.

In step 606, the edge computing application 11-*a* of the edge computing host 1-*a* sends a user context transfer request to the edge computing application of the edge computing host after time indicated by the minimum delay information for initiating the user context information synchronization operation, where the user context transfer request includes user context information.

If the response message does not indicate the minimum delay information for initiating the user context information synchronization operation, there is no implementation limitation for the edge computing host 1-*a* to initiate the user context information synchronization operation.

In this embodiment, the user context information included in the user context transfer request sent by the edge computing application 11-*a* of the edge computing host 1-*a* to an edge computing application 11-*b* of the edge computing host 1-*b* is transparent to the edge computing platform 12-*a* of the edge computing host 1-*a* and the edge computing platform 12-*b* of the edge computing host 1-*b*, and the edge computing platform 12-*a* of the edge computing host 1-*a* and the edge computing platform 12-*b* of the edge computing host 1-*b* do not need to know what to send, thereby improving the security.

In step 607, the edge computing application 11-*b* of the edge computing host 1-*b* sends a user context transfer response to the edge computing application 11-*a* of the edge computing host 1-*a*, confirming that the transfer of the user context information included in the user context transfer request is successful.

In step 608, the edge computing host 1-*a* terminates the edge computing application 11-*a* of the edge computing host 1-*a*.

Example 2

Figure 12:
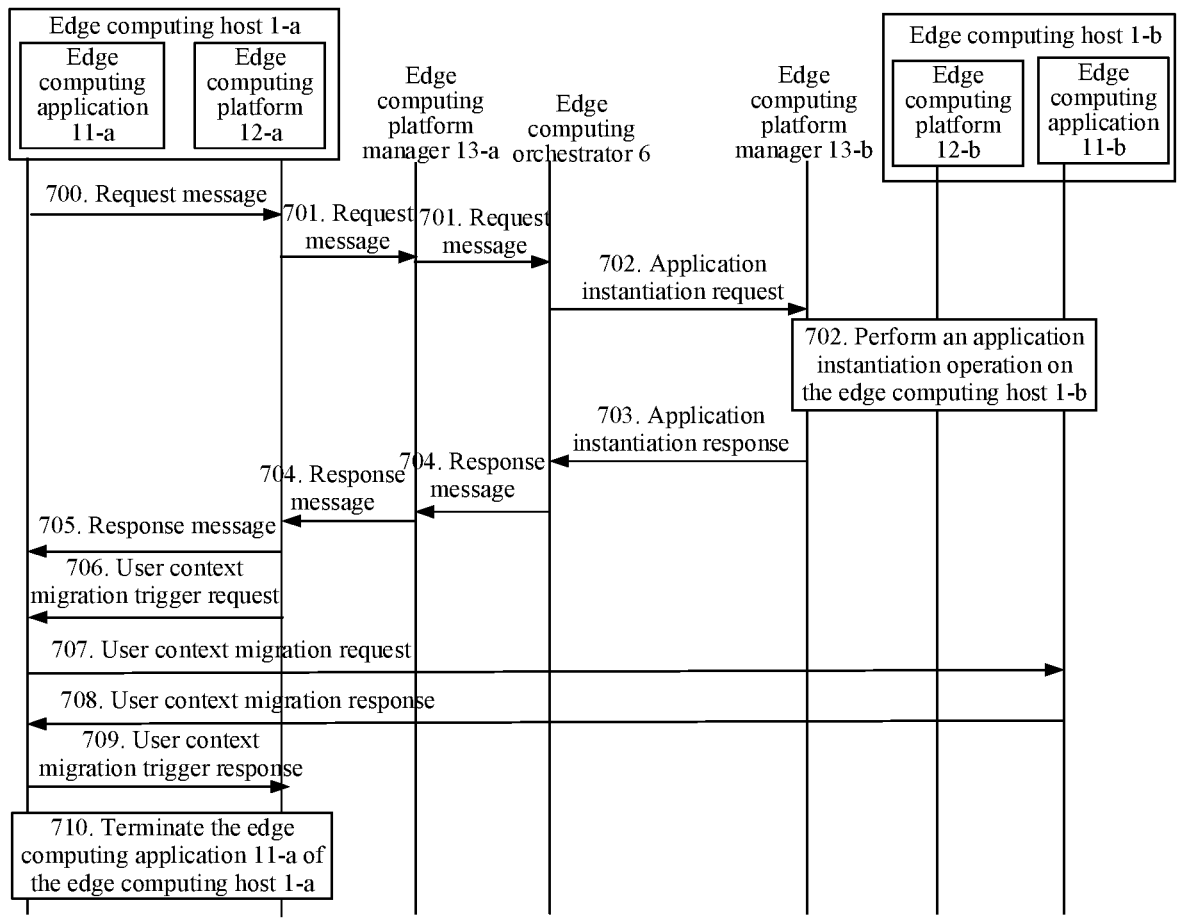
FIG. 12 is a flowchart of an example 2 of a method for transferring an edge computing application according to an embodiment of the present disclosure.

In the mobile network, for example, the 4G or 5G network, when a UE moves from an area served by a cell A to an area served by a cell B, the handover occurs in a case where certain conditions are met, that is, the UE switches the attachment relationship from the cell A to the cell B. Information received by an edge computing application A may be based on services provided by an edge computing host, for example, in the ETSI MEC, an edge computing platform provides several basic services, including the wireless network information service and the location service. The cell handover event of the UE can be known through wireless network information, and the location change of the UE can be known through the location service. The edge computing application A knows that the UE has left a current service range of the edge computing host through services provided by the edge computing platform. The edge computing application may trigger a transfer operation of the edge computing application, and the operation includes steps shown in FIG. 12.

In step 700, an edge computing application 11-*a* of an edge computing host 1-*a* sends a request message to an edge computing platform 12-*a* of the edge computing host 1-*a*.

In this step, the request message may be an application instance transfer request message, an edge computing application transfer request message or other request messages.

The request message includes user information.

The user information includes at least one of: location information of a user, or information for identifying a user application.

The location information is identified by an identification of a cell to which the UE belongs (e.g., ECGI or NCGI), or is identified by an IP address of the cell to which the UE belongs, or an IP address of the UE, or a geographical address of the UE.

The information for identifying a user application, for example, may be an application description identification, or a package identification, or other information which can be mapped into the application description identification or the package identification.

In step 701, the edge computing platform 12-*a* of the edge computing host 1-*a* sends the request message to an edge computing platform manager 13-*a*, and the edge computing platform manager 13-*a* sends the request message to an edge computing orchestrator 6.

In this step, the request message may be an application instance transfer request message, an edge computing application transfer request message or other request messages.

The request message includes user information.

The user information includes at least one of: location information of a user, or information for identifying a user application.

The location information is identified by an identification of a cell to which the UE belongs (e.g., ECGI or NCGI), or an IP address of the cell to which the UE belongs, or an IP address of the UE, or a geographical address of the UE.

The information for identifying a user application, for example, may be an application description identification, or a package identification, or other information which can be mapped into the application description identification or the package identification.

In step 702, the edge computing orchestrator 6 determines an edge computing host 1-*b* according to the user information and sends an application instantiation request to an edge computing platform manager 13-*b*, and the edge computing platform manager 13-*b* triggers an application instantiation operation on the edge computing host.

In this step, the edge computing application instantiation request at least includes information for identifying a user application.

In step 703, after the edge computing host 1-*b* completes the application instantiation operation, the edge computing platform manager 13-*b* sends an application instantiation response to the edge computing orchestrator 6.

In this embodiment, the application instantiation response includes information of the edge computing application of the edge computing host 1-*b*, and may further include at least one of: minimum delay information for initiating a user context information synchronization operation, or validity period information of a user context information synchronization operation.

In step 704, the edge computing orchestrator 6 sends a response message to the edge computing platform manager 13-*a*, and the edge computing platform manager 13-*a* sends the response message to the edge computing platform 12-*a*.

In this step, the response message, for example, may be an application instance transfer response message, an edge computing application response message or other response messages.

The response message includes the edge computing application information of the edge computing host 1-*b*, and may further include at least one of: minimum delay information of a user context information synchronization operation, or validity period information of a user context information synchronization operation, information for triggering the transfer operation of the user context.

In step 705, the edge computing platform 12-*a* of the edge computing host 1-*a* sends a response message to the edge computing application 11-*a* of the edge computing host 1-*a*, where the response message only includes information about application instantiation success.

In step 706, the edge computing platform 12-*a* of the edge computing host 1-*a* sends a user context transfer trigger request to the edge computing application 11-*a* of the edge computing host 1-*a*.

In this step, the user context transfer trigger request includes the edge computing application information of the edge computing host 1-*b*, and may further include at least one of: minimum delay information of a user context information synchronization operation, or validity period information of a user context information synchronization operation.

In step 707, the edge computing application 11-*a* of the edge computing host 1-*a* sends a user context transfer request to the edge computing application 11-*b* of the edge computing host 1-*b*.

In this step, the user context transfer request includes user context information.

The user context information included in the user context transfer request sent by the edge computing application 11-*a* of the edge computing host 1-*a* to the edge computing application 11-*b* of the edge computing host 1-*b* is transparent to an edge computing platform 11 of the edge computing host 1-*a* and an edge computing platform 21 of the edge computing host 1-*b*, and the edge computing platform 11 of the edge computing host 1-*a* and the edge computing platform 21 of the edge computing host 1-*b* do not need to know what to send, thereby improving the security.

In step 708, the edge computing application 11-*b* of the edge computing host 1-*b* sends a user context transfer response to the edge computing application 11-*a* of the edge computing host 1-*a*, confirming that the transfer of the user context information included in the context transfer request is successful.

In step 709, the edge computing application 11-*a* of the edge computing host 1-*a* sends a user context transfer trigger response to the edge computing platform 12-*a* of the edge computing host 1-*a*.

In step 710, the edge computing host 1-*a* terminates the edge computing application 11-*a* of the edge computing host 1-*a*.

Example 3

Figure 13:
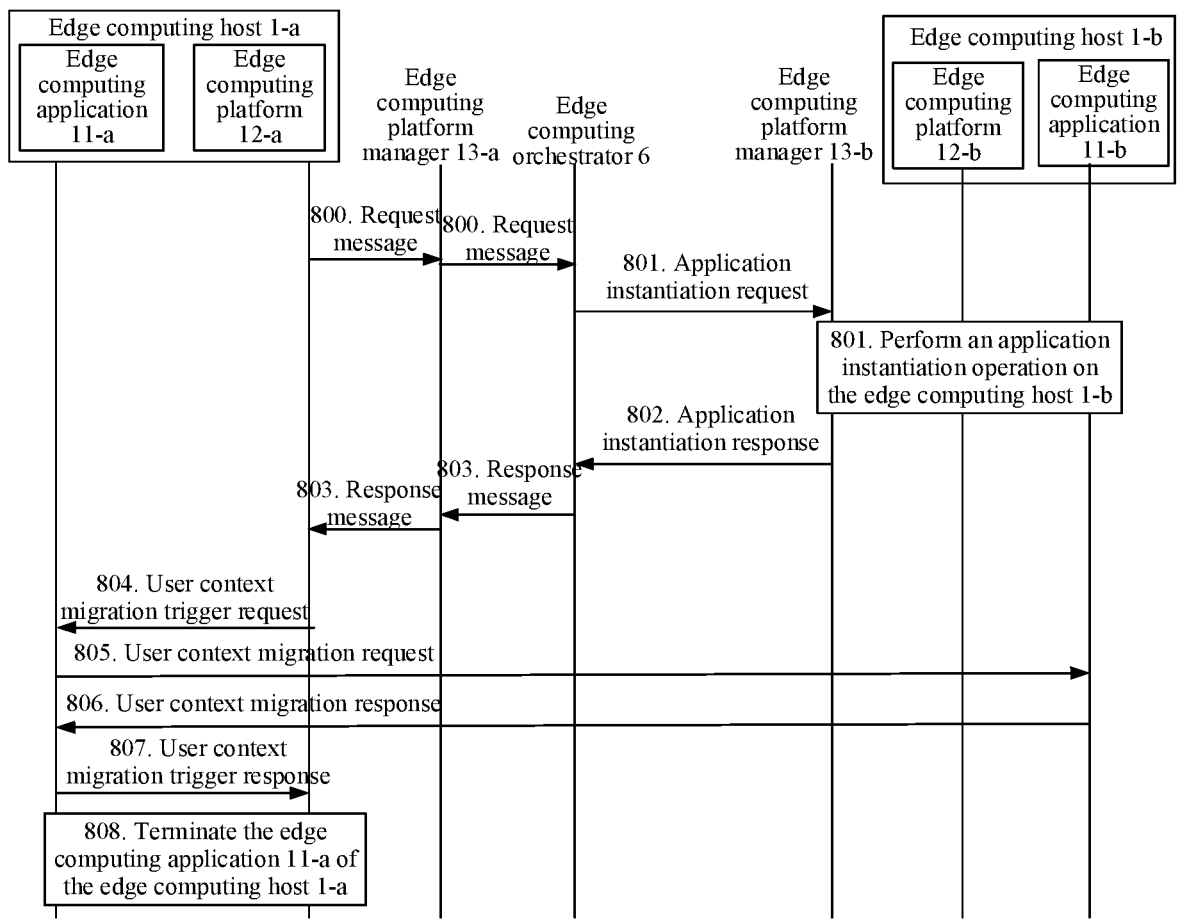
FIG. 13 is a flowchart of an example 3 of a method for transferring an edge computing application according to an embodiment of the present disclosure.

In the mobile network, for example, the 4G or 5G network, when a UE moves from an area served by a cell A to an area served by a cell B, the handover occurs in a case where certain conditions are met, that is, the UE switches the attachment relationship from the cell A to the cell B. Information received by an edge computing application A may be based on services provided by an edge computing host, for example, in the ETSI MEC, an edge computing platform provides several basic services, including the wireless network information service and the location service. The cell handover event of the UE can be known through wireless network information, and the location change of the UE can be known through the location service. The edge computing application A knows that the UE has left a current service range of the edge computing host through services provided by the edge computing platform. The edge computing host assists the edge computing application to complete the application transfer, and the operation includes steps shown in FIG. 13.

In step 800, an edge computing platform 12-*a* of an edge computing host 1-*a* sends a request message to an edge computing platform manager 13-*a*, and the edge computing platform manager 13-*a* sends the request message to an edge computing orchestrator 6.

In this step, the request message may be an application instance transfer request message, an edge computing application transfer request message or other request messages.

The request message includes user information.

The user information includes at least one of: location information of a user, or information for identifying a user application.

The location information is identified by an identification of a cell to which the UE belongs (e.g., ECGI or NCGI) or an IP address of the cell to which the UE belongs.

The information for identifying a user application, for example, may be an application description identification, or a package identification, or other information which can be mapped into the application description identification or the package identification.

In step 801, the edge computing orchestrator 6 determines an edge computing host 1-*b* according to the user information and sends an application instantiation request to the edge computing platform manager 13-*b*, and the edge computing platform manager 13-*b* triggers an application instantiation operation on the edge computing host.

In this step, the application instantiation request at least includes information for identifying a user application.

In step 802, after the edge computing host 1-*b* completes the application instantiation operation, the edge computing platform manager 13-*b* sends an application instantiation response to the edge computing orchestrator 6.

In this embodiment, the application instantiation response includes information of the edge computing application of the edge computing host 1-*b*, and may further include at least one of: minimum delay information for initiating a user context information synchronization operation, or validity period information of a user context information synchronization operation.

In step 803, the edge computing orchestrator 6 sends a response message to the edge computing platform manager 13-*a*, and the edge computing platform manager 13-*a* sends the response message to the edge computing platform 12-*a*.

In this step, the response message includes the edge computing application information of the edge computing host 1-*b*, and may further include at least one of: minimum delay information for initiating a user context information synchronization operation, or validity period information of a user context information synchronization operation, information for triggering the transfer operation of the user context.

In step 804, the edge computing platform 12-*a* of the edge computing host 1-*a* sends a user context transfer trigger request to the edge computing application 11-*a* of the edge computing host 1-*a*.

In this step, the user context transfer trigger request includes the edge computing application information of the edge computing host 1-*b*, and may further include at least one of: minimum delay information for triggering a user context information synchronization operation, or validity period information of a user context information synchronization operation, information for triggering the transfer operation of the user context.

In step 805, the edge computing application 11-*a* of the edge computing host 1-*a* sends a user context transfer request to the edge computing application 11-*b* of the edge computing host 1-*b*.

In this step, the user context transfer request includes user context information.

The user context information included in the user context transfer request sent by the edge computing application 11-*a* of the edge computing host 1-*a* to the edge computing application 11-*b* of the edge computing host 1-*b* is transparent to the edge computing platform 12-*a* of the edge computing host 1-*a* and the edge computing platform 12-*b* of the edge computing host 1-*b*, and the edge computing platform 12-*a* of the edge computing host 1-*a* and the edge computing platform 12-*b* of the edge computing host 1-*b* do not need to know what to send, thereby improving the security.

In step 806, the edge computing application 11-*b* of the edge computing host 1-*b* sends a user context transfer response to the edge computing application 11-*a* of the edge computing host 1-*a*, confirming that the transfer of the user context information included in the context transfer request is successful.

In step 807, the edge computing application 11-*a* of the edge computing host 1-*a* sends a user context transfer trigger response to the edge computing platform 12-*a* of the edge computing host 1-*a*.

In step 808, the edge computing host 1-*a* terminates the edge computing application 11-*a* of the edge computing host 1-*a*.

Figure 14:
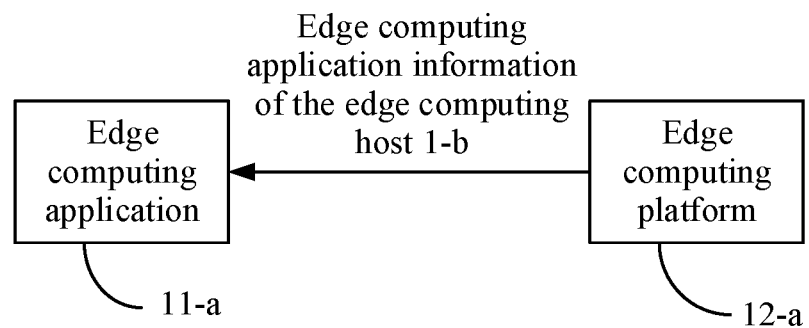
FIG. 14 is a structural diagram of an apparatus for transferring an edge computing application according to another embodiment of the present disclosure.

With reference to FIG. 14, another embodiment of the present disclosure provides an apparatus for implementing edge computing application transfer (e.g., an edge computing host 1-*a*), and the apparatus includes an edge computing platform 12-*a* and an edge computing application 11-*a*.

The edge computing platform 12-*a* is configured to send a first message to an edge computing application 11-*a*, where the first message includes edge computing application information of a second edge computing host.

The edge computing application 11-*a* is configured to receive the first message sent by the edge computing platform 12-*a* of the edge computing host 1-*a*, and send a second message to an edge computing application 11-*b* of an edge computing host 1-*b*, where the second message carries user context information.

In another embodiment of the present disclosure, the edge computing platform 12-*a* is further configured to terminate the edge computing application 11-*a* of the edge computing host 1-*a*.

In another embodiment of the present disclosure, the edge computing application 11-*a* is further configured to send a third message to the edge computing platform 12-*a* of the edge computing host 1-*a*, where the third message carries user information.

In another embodiment of the present disclosure, the edge computing application 11-*a* is further configured to receive a sixth message of the edge computing platform 12-*a*.

Another embodiment of the present disclosure provides an apparatus for implementing edge computing application transfer (e.g., an edge computing platform manager 13-*b*), and the apparatus includes a receiving module and an instantiation module.

The receiving module is configured to receive a first message, where the first message carries application instance information.

The instantiation module is configured to perform an edge computing application operation on an edge computing host according to the application instance information.

In another embodiment of the present disclosure, the apparatus further includes a sending module.

The sending module which is configured to send a second message, where the second message includes at least one of: minimum delay information for initiating a user context information synchronization operation, validity period information of a user context information synchronization operation, or edge computing application information of a first edge computing host.

Another embodiment of the present disclosure provides an apparatus for implementing edge computing application transfer (e.g., an edge computing host 1-*b*), and the apparatus includes an edge computing application 11-*b*.

The edge computing application 11-*b* is configured to receive a first message of an edge computing application 11-*a* of an edge computing host 1-*a*, where the first message carries user context information.

In another embodiment, the edge computing application 11-*b* is further configured to send a second message to the edge computing application 11-*a*.

Another embodiment of the present disclosure provides an apparatus for implementing edge computing application transfer (e.g., an edge computing orchestrator 6), and the apparatus includes a receiving module and a sending module.

The receiving module is configured to receive a first message sent by a first edge computing host, where the first message carries user information.

The sending module is configured to send a second message to a second edge computing host, where the second message includes application instance information.

Another embodiment of the present disclosure provides an apparatus for transferring an edge computing application, including a processor and a computer-readable storage medium having instructions stored thereon that, when executed by the processor, implement any method for transferring an edge computing application described above.

Another embodiment of the present disclosure provides a computer-readable storage medium having a computer program stored thereon which, when executed by a processor, implements steps of any method for transferring an edge computing application described above.

The computer storage medium includes, but is not limited to, a random access memory (RAM), a read-only memory (ROM), an electrically erasable programmable read-only memory (EEPROM), a flash memory or other memory technologies, a compact disc-read only memory (CD-ROM), a digital versatile disc (DVD) or other optical disc storage, a magnetic cassette, a magnetic tape, a magnetic disk storage or other magnetic storage devices, or any other media used for storing desired information and capable of being accessed by a computer.

Figure 15:
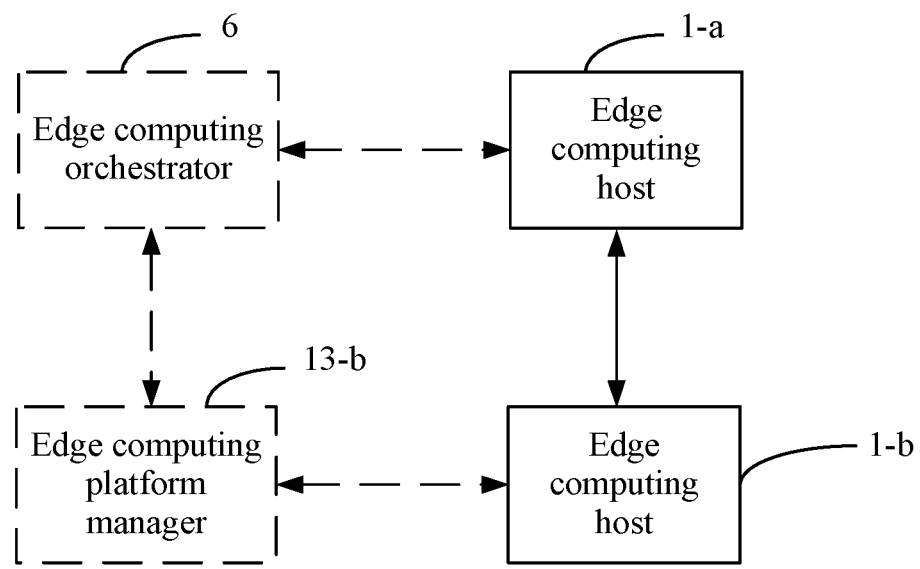
FIG. 15 is a structural diagram of a system for transferring an edge computing application according to another embodiment of the present disclosure.

With reference to FIG. 15, another embodiment of the present disclosure provides a system for transferring an edge computing application. The system includes an edge computing host 1-*a* and an edge computing host 1-*b*.

An edge computing application 11-*a* of the edge computing host 1-*a* is configured to receive a first message sent by an edge computing platform 12-*a* of the edge computing host 1-*a*, where the first message includes edge computing application information of the edge computing host 1-*b*, and send a second message to an edge computing application 11-*b* of the edge computing host 1-*b* according to the edge computing application information of the edge computing host 1-*b*, where the second message carries user context information.

The edge computing application 11-*b* of the edge computing host 1-*b* is configured to receive the second message of the edge computing application 11-*a*.

In another embodiment of the present disclosure, the edge computing platform 12-*a* of the edge computing host 1-*a* is further configured to terminate the edge computing application 11-*a* of the edge computing host 1-*a*.

In another embodiment of the present disclosure, the system further includes: an edge computing orchestrator 6 and an edge computing platform manager 13-*b*.

The edge computing platform 12-*a* of the edge computing host 1-*a* is further configured to send a third message to the edge computing orchestrator 6, where the third message includes user information, and receive a fourth message of the edge computing orchestrator 6, where the fourth message includes the edge computing application information of the second edge computing host.

The edge computing orchestrator 6 is configured to receive the third message, and send a fifth message to the edge computing platform manager 13-b, where the fifth message includes application instance information; and receive a sixth message of the edge computing platform manager 13-b, and send the fourth message to the edge computing platform 12-a.

The edge computing platform manager 13-b is configured to receive the fifth message, trigger an application instantiation operation on the edge computing host 1-b, and send the sixth message to the edge computing orchestrator 6.

Although the implementation modes disclosed in the embodiments of the present disclosure are as described above, the content thereof is merely implementation modes for facilitating the understanding of the embodiments of the present disclosure and is not intended to limit the present disclosure. Any person skilled in the art to which the present disclosure pertains may make any modifications and variations on the implementation forms and details without departing from the spirit and scope disclosed in the present disclosure, but the scope of the embodiments of the present disclosure shall still be subject to the scope defined by the appended claims.

INDUSTRIAL APPLICABILITY

In the embodiments of the present disclosure, the edge computing application 11-a of the edge computing host 1-a initiates the transfer of an edge computing application, and initiates user context transfer, and then user context information directly passes through between edge computing platforms of the edge computing hosts, so that the user context information will not be exposed to the edge computing platforms and the edge computing orchestrator, improving the security of the user context information.

What is claimed is:

1. A method for transferring an edge computing application, comprising:
    receiving, by a first edge computing application of a first edge computing host in a multi-access edge computing (MEC) architecture, a first message sent by an edge computing platform of the first edge computing host, wherein the first message comprises edge computing application information of a second edge computing host in the MEC architecture; and
    sending, by the first edge computing application, a second message directly to a second edge computing application of the second edge computing host according to the edge computing application information of the second edge computing host, wherein the second message carries user context information.

2. The method of claim 1, further comprising:
    sending, by the first edge computing application, a third message to the edge computing platform of the first edge computing host, wherein the third message carries user information.

3. The method of claim 2, wherein the user information comprises at least one of:
    location information of a user, or information for identifying a user application.

4. The method of claim 1, further comprising:
    sending, by the first edge computing host, a fourth message to an edge computing orchestrator, wherein the fourth message comprises user information.

5. The method of claim 1, further comprising:
    receiving, by the first edge computing host, a fifth message sent by an edge computing orchestrator, wherein the fifth message comprises the edge computing application information of the second edge computing host.

6. The method of claim 5, wherein the first message or the fifth message further comprises at least one of: minimum delay information for initiating a user context information synchronization operation, or validity period information of a user context information synchronization operation.

7. The method of claim 5, wherein the user information comprises at least one of:
    location information of a user, or information for identifying a user application.

8. The method of claim 1, wherein the first message further comprises at least one of: minimum delay information for initiating a user context information synchronization operation, or validity period information of a user context information synchronization operation.

9. The method of claim 1, further comprising:
    receiving, by the first edge computing application, a sixth message of the first edge computing platform.

10. The method of claim 1, wherein the edge computing application information of the second edge computing host comprises at least one of:
    address information of the second edge computing host, port information used by an edge computing application of the second edge computing host, or identification information of an edge computing application of the second edge computing host.

11. A method for transferring an edge computing application, comprising:
    receiving, by an edge computing platform manager in a multi-access edge computing (MEC) architecture, a first message, wherein the first message carries application instance information; and
    performing, by the edge computing platform manager, an application instantiation operation on an edge computing host according to the application instance information,
    wherein the method further comprises:
    sending, by the edge computing platform manager, a second message to an edge computing orchestrator in the MEC architecture, wherein the second message comprises at least one of: minimum delay information for initiating a user context information synchronization operation, validity period information of a user context information synchronization operation, or edge computing application information of the edge computing host.

12. The method of claim 11, wherein the application instance information comprises at least one of: an application identification, a package identification, or a package description identification.

13. An apparatus for transferring an edge computing application, comprising a processor and a computer-readable storage medium, wherein the computer-readable storage medium stores a plurality of instructions, wherein the plurality of instructions is configured to, when executed by the processor, implement the method for transferring an edge computing application of claim 1.

14. A non-transitory computer-readable storage medium, which is configured to store a computer program, wherein the computer program is configured to, when executed by a processor, implement steps of the method for transferring an edge computing application of claim 1.

15. An apparatus for transferring an edge computing application, comprising a processor and a computer-readable storage medium, wherein the computer-readable storage medium stores a plurality of instructions, wherein the plurality of instructions is configured to, when executed by the processor, implement the method for transferring an edge computing application of claim 11.

16. A non-transitory computer-readable storage medium, which is configured to store a computer program, wherein the computer program is configured to, when executed by a processor, implement steps of the method for transferring an edge computing application of claim 11.

* * * * *